United States Patent [19]

Nogiwa et al.

[11] Patent Number: 4,793,956
[45] Date of Patent: Dec. 27, 1988

[54] PROCESS FOR PREPARING POROUS FILM OR SHEET

[75] Inventors: Motomi Nogiwa, Zushi; Shuichi Yoshida, Yokohama; Shigeki Komori, Sagamihara; Toshitsune Yoshikawa, Kawasaki; Toshio Koutsuka, Yokohama, all of Japan

[73] Assignee: Nippon Petrochemicals Company, Limited, Tokyo, Japan

[21] Appl. No.: 946,074

[22] Filed: Dec. 24, 1986

[30] Foreign Application Priority Data

Dec. 26, 1985 [JP] Japan ................. 60-291996

[51] Int. Cl.$^4$ ...................... B29C 67/20; B29C 55/02
[52] U.S. Cl. ...................... 264/41; 264/154; 264/288.8; 264/290.2; 521/134; 525/240
[58] Field of Search ............. 264/41, 147, 154, 288.8, 264/290.2

[56] References Cited

U.S. PATENT DOCUMENTS 4,472,328  9/1984  Sugimoto et al. ............. 264/147 X

FOREIGN PATENT DOCUMENTS 60-6441  1/1985  Japan ................. 264/41

Primary Examiner—Philip Anderson
Attorney, Agent, or Firm—Stevens, Davis, Miller & Mosher

[57] ABSTRACT

A process for preparing a porous film or sheet, which process comprises melt-forming a composition into a film or sheet and then stretching the thus-formed film or sheet at a temperature in the range of 30° to 110° C., said composition containing:

(a) 30-90% by weight of a linear low-density polyethylene having a density not smaller than 0.910 g/cm$^3$ and smaller than 0.940 g/cm$^3$;

(b) 10-70% by weight of an ethylene/α-olefin copolymer having a density not smaller than 0.860 g/cm$^3$ and smaller than 0.910 g/cm$^3$, a boiling n-hexane insolubles content not less than 10% by weight and a maximum peak temperature not lower than 100° C. as measured according to a differential scanning calorimetry; and (c) 20-500 parts by weight of a filler based on 100 parts by weight of said resin components.

5 Claims, 1 Drawing Sheet

DSC MEASUREMENT OF ETHYLENE COPOLYMERS

1 : LLDPE
2 : ULDPE (USED IN THE PRESENT INVENTION)
3 : EPR

PROCESS FOR PREPARING POROUS FILM OR SHEET

BACKGROUND OF THE INVENTION

The present invention relates to a process for preparing a porous film or sheet (both hereinafter referred to as "film") and more particularly to a process for preparing a porous film having a high flexibility, a high tearing strength and a high gas and moisture permeability and capable of being utilized in the fields of clothing, sanitary articles, medical supplies and filter medium.

It has heretofore been conducted to mix a polyolefin resin such as polyethylene with a filler, followed by melt extrusion, and then stretching the resulting film to obtain a porous film. However, a film obtained by using such mixture of a polyolefin resin and a filler is poor in stretchability, thus making it impossible to effect its stretching at a low stretch ratio, while when it is stretched at a high stretch ratio, the stretched film is low in tearing strength and its flexibility is poor. In view of these problems, various attempts for solution have been made. Many of those attempts involve the addition of a liquid compound in addition to the polyolefin resin and the filler. For example, in Japanese Patent Laid Open No. 47334/1982, liquid polybutadiene and liquid polybutene are used; in Japanese Patent Laid Open No. 203520/1982, liquid polyhydroxy-saturated hydrocarbons are used; in Japanese Patent Laid Open No. 149925/1983, liquid polyisoprene rubber is used; and in Japanese Patent Laid Open No. 140235/1984, epoxidated vegetable oils are used. In porous films obtained according to these methods, however, the liquid additives dissolve out when the films come into contact with solvents or chemicals. Even the polyolefin most flexible among those used in the above conventional methods is a linear low-density polyethylene having a density of 0.910 to 0.940 g/cm$^3$, and thus the flexibility is still insufficient and a more flexible film has been desired.

SUMMARY OF THE INVENTION

It is an object of the present invention to provide a process for preparing a porous film capable of overcoming the above-mentioned drawbacks involved in the conventional processes for making polyolefin resin-based porous films, the porous film prepared by the process of the invention having well-balanced physical properties, including a high tearing strength, and capable of being strtteched at a low stretch ratio. It is another object of the present invention to prepare a porous film superior in flexibility, gas and moisture permeability, and resistance to solvents and chemicals.

The present invention resides in a process for preparing a porous film by melt-forming a composition into a film and stretching the film at a temperature in the range of 30° to 110° C., the said composition containing:
(a) 30–90% by weight of a linear low-density polyethylene having a density not smaller than 0.910 g/cm$^3$ and smaller than 0.940 g/cm$^3$;
(b) 10–70% by weight of an ethylene/α–olefin copolymer having a density not smaller than 0.860 g/cm$^3$ and smaller than 0.910 g/cm$^3$, a content of insolubles in boiling n-hexane not less than 10% by weight and a maximum peak temperature not lower than 100° C. as measured according to a differential scanning calorimetry (DSC); and
(c) 20–500 parts by weignt of a filler based on 100 parts by weight of the above resin components.

DETAILED DESCRIPTION OF THE INVENTION

The linear low-density polyethylene (hereinafter referred to as "LLDPE") having a density not smaller than 0.910 g/cm$^3$ and smaller than 0.940 g/cm$^3$ used in the present invention is a copolymer obtained by ion-polymerization of ethylene and an α-olefin such as propylene, 1-butene, 1-hexene, or 4-methyl-1-pentene, at low temperature and pressure, generally using a Ziegler catalyst. These copolymers are in wide use mainly for preparing films. It is necessary for the LLDPE to have a density in the range of not smaller than 0.910 g/cm$^3$ and smaller than 0.940 g/cm$^3$. If its density is below 0.910 g/cm$^3$, the resulting film will be poor in both tensile strength and heat resistance. And if it is above 0.940 g/cm$^3$, the resulting film will be poor in stretchability and its flexibility will be impaired.

The LLDPE has a melt flow rate (MFR) of preferably 0.05 to 50 g/10 min, more preferably 0.5 to 10 g/10 min. If its melt flow rate is below 0.05 g/10 min, the blending of a filler may be difficult, and if it is above 50 g/10 min, the forming of a film may become difficult.

The ethylene/α-olefin copolymer (b) (hereinafter referred to as "ULDPE"), used in the present invention, having a density not smaller than 0.860 g/cm$^3$ and smaller than 0.910 g/cm$^3$, a content of insolubles in boiling n-hexane not less than 10 wt. % and a maximum peak temperature not lower than 100° C. as measured according to DSC, is a copolymer of etnylene and an α-olefin having 3 to 12 carbon atoms.

Examples of the α-olefin are propylene, 1-butene, 4-methyl-1-pentene, 1-hexene, 1-octene, 1-decene and 1-dodecene. The α-olefin content in the ethylene/α-olefin copolymer is in the range of 2 to 40 mol %, preferably 5 to 20 mol %.

The following description is provided about how to prepare the ULDPE used in the present invention.

The catalyst system used comprises a solid catalyst component and an organoaluminum compound, the solid catalyst component containing, magnesium and titanium. The solid catalyst component is obtained by supporting a titanium compound on an inorganic solid compound containing magnesium by a known method. Examples of magnesium-containing inorganic solid compounds include, in addition to metal magnesium, magnesium hydroxide, magnesium carbonate, mannesium oxide, magnesium chloride, as well as double salts, double oxides, carbonates, chlorides and hydroxides, which contain magnesium atom and a metal selected from silicon, aluminum and calcium, further, these inorganic solid compounds after treatment or reaction with oxygen-containing compounds, sulfur-containing compounds, aromatic hydrocarbons or halogen-containing substances.

As examples of the above oxygen-containing compounds are mentioned water, organic oxygen-containing compounds such as alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds are mentioned organic sulfur-containing compounds such as thiols, thio-ethers and the like, inorganic sulfur-containing compounds sucn as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

To illustrate the titanium compound, mention may be made of halides, alkoxyhalides, alkoxides and halogenated oxides, of titanium. Tetravalent and trivalent titanium compounds are preferred. As tetravalent titanium compounds are preferred those represented by the general formula $Ti(OR)_nX_{4-n}$ wherein R is an alkyl, aryl or aralkyl group having 1 to 20 carbon atoms, X is a halogen atom and n is $0 \leq n \leq 4$, such as, for example, titanium tetrachloride, titanium tetrabromide, titanium tetraiodide, monomethoxytrichlorotitanium, dimethoxydichlorotitanium, triethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorititanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As examples of trivalent titanium compounds are mentioned titanium trihalides obtained by reducing titanium tetrahalides such as titanium tetrachloride and titanium tetrabromide with hydrogen, aluminum, titanium or an organometallic compound of a Group I-III metal in the Periodic Table, as well as trivalent titanium compounds obtained by reducing tetravalent alkoxytitanium halides of the general formula $Ti(OR)_mX_{4-m}$ with an organometallic compound of a Group I-III metal in the Periodic Table in which formula R is an alkyl, aryl or aralkyl group having 1 to 20 carbon atoms, X is a halogen atom and m is $0<m<4$. Tetravalent titanium compounds are particularly preferred.

As other examples of catalyst systems are mentioned combinations of organoaluminum compounds with reaction products as solid catalyst components obtained by the reaction of organomagnesium compounds such as so-called Grignard compounds with titanium compounds. Examples of organomagnesium compounds are those of the general formulae $RMgX$, $R_2Mg$ and $RMg(OR)$ wherein R is an organic radical having 1 to 20 carbon atoms and X is a halogen atom, and ether complexes thereof, as well as modified compounds obtained by modifying these organomagnesium compounds with other organometallic compounds such as, for example, organosodium, organolithium, organopotassium, organoboron, organocalcium and organozinc.

As still other examples of catalyst systems are mentioned combinations of organoaluminum compounds with solid products obtained by contacting such inorganic oxides as $SiO_2$ and $Al_2O_3$ with the solid catalyst component containing at least magnesium and titanium. In addition to $SiO_2$ and $Al_2O_3$ there also may be mentioned $CaO$, $B_2O_3$ and $SnO_2$ as examples of inorganic oxides. Double oxides thereof are also employable without any trouble.

As preferred examples of the organoaluminum compound to be combined with the solid catalyst component are mentioned those represented by the general formulae $R_3Al$, $R_2AlX$, $RAlX_2$, $R_2AlOR$, $RAl(OR)X$ and $R_3Al_2X_3$ wherein Rs, which may the same or different, are each an alkyl, aryl or aralkyl group having 1 to 20 carbon atoms, such as triethylaluminum, triisobutylaluminum, trihexylaluminum, trioctylaluminum, diethylaluminum chloride, diethylaluminum ethoxide, ethylaluminum sesquichloride, and mixtures thereof.

The amount of the organoaluminum compound used is not specially limited, but usually it is in the range of 0.1 to 1,000 mols per mol of the titanium compound.

The copolymerization reaction is carried out in the same manner as in the conventional olefin polymerization reaction using a Ziegler type catalyst. More particularly, the reaction is performed in a substantially oxygen- and water-free condition in vapor phase or in the presence of an inert solvent or using monomer per se as solvent. Olefin polymerizing conditions involve temperatures in the range of 20° to 300° C., preferably 40° to 200° C., and pressures in the range from normal pressure to 70 kg/cm²·G, preferably 2~60 kg/cm²·G. The molecular weight can be adjusted to some extent by changing polymerization conditions such as polymerization temperature and catalyst mol ratio, but the addition of hydrogen into the polymerization system is more effective for this purpose. Of course, two or more stage polymerization reaction involving different polymerization conditions such as different hydrogen concentrations and different polymerization temperatures can be carried out without any trouble.

The ULDPE used in the present invention has a density not smaller than 0.860 g/cm³ and smaller than 0.910 g/cm³, a content of insolubles in boiling n-hexane (hereinafter referred to as "$C_6$ insolubles content") not less than 10 wt. %, and a maximum peak temperature (hereinafter referred to as "Tm") not lower than 100° C. as measured according to DSC. If the density is below 0.860 g/cm³, the heat resistance and strength of the resulting film will be poor, and if it is above 0.910 g/cm³, a deteriorated stretchability will result. Particularly, at a low stretch ratio of 1.5 to 4, there will occur unevenness in stretching (a mixed state of both stretched and unstretched portions) and the flexiblity will also be impaired.

If the $C_6$ insolubles content is below 10 wt. % and Tm below 100° C., the film strength and heat resistance will be unsatisfactory.

How to determine the $C_6$ insolubles content and measure Tm are as follows.

A 200 μm thick sheet was formed using a hot press, from which were then cut out three sheets each 20 mm long by 30 mm wide. Using these sheets, extraction was made in boiling n-hexane for 5 hours by means of a double-tube type Soxhlet extractor. $C_6$ insolubles were taken out and vacuum-dried (50° C., 7 hours), then $C_6$ insolubles content was calculated in accordance with the following equation:

$$C_6 \text{ Insolubles Content (wt. \%)} = \frac{\text{Weight of Sheet after Extraction}}{\text{Weight of Sheet before Extraction}} \times 100$$

About 5 mg of a specimen was accurately weighed from a hot-pressed 100 μm thick film and then set on a differential scanning calorimeter. The temperature was raised to 170° C. and the specimen was held at this temperature for 15 minutes, thereafter cooled to 0° C. at a rate of 2.5° C./min. Then, measurement was done with raising the temperature from this state to 170° C. at a rate of 10° C./min. The temperature at the vertex position of the maximum peak of peaks which appeared during the heat-up period from 0° to 170° C. was regarded as Tm.

The ULDPE has an MFR of preferably 0.05 to 50 g/10 min, more preferably 0.3 to 10 g/10 min. If its melt flow rate is below 0.05 g/10 min, the blending of a filler will become difficult, and if it is above 50 g/10 min, the film formability will be deteriorated.

The ULDPE used in the present invention is a special ethylene copolymer inlluding a highly crystalline portion and an amorphous portion, obtained by the copolymerization of ethylene and α-olefin, and thus having both the mechanical strength and heat resistance of conventional crystalline polyolefin resins and the rubbery elasticity and flexibility of conventional amorphous polymers.

As conventional commercially available ethylene/α-olefin copolymers of this sort, the same LLDPE as the component (a) and ethylene-propylene copolymer rubber (hereinafter referred to as "EPR") are known.

However, the ULDPE used in the present invention is clearly distinguished from those conventional LLDPE and EPR. For example, FIG. 1 shows crystal melt behaviors of typical LLDPE, ULDPE and EPR as determined according to DSC. As is seen from the results shown therein, the LLDPE still has a considerable degree of crystallinity and is superior in heat resistance and mechanical strength, but is poor in flexibility and less receptive of inorganic fillers; besides, at a low stretch ratio there occurs unevenness in stretching, making it impossible to obtain a good porous film.

On the other hand, the commercially available EPR is produced using a solid catalyst containing vanadium as a main component, and it has little crystallinity. Even if a crystalline portion is present, its proportion is extremely small and Tm according to DSC is far lower than 100° C.

Such EPR does not have the above-mentioned drawbacks of the LLDPE, that is, poor flexibility, lack of receptivity of inorganic fillers, or unevenness in stretching at low stretch ratios. But it involves the problem that its heat resistance and mechanical strength are reduced.

The ratio of the LLDPE to the ULDPE both used in the present invention is 30~90% : 70~10% in terms of weight % ratio. If the proportion of the LLDPE is below 30 wt. %, the film strength and heat resistance will be low, and a proportion belww 10% of the ULDPE will result in poor stretchability and unevenness in stretching at low stretch temperatures.

Examples of the filler (c) used in the present invention include both inorganic and organic fillers. As inorganic fillers there may be used, for example, calcium carbonate, talc, silica, clay, kaolin, alumina, aluminum hydroxide, magnesia, magnesium hydroxide, calcium sulfate, calcium sulfite, barium sulfate, aluminum silicate, calcium silicate, sodium silicate, potassium silicate, magnesium carbonate, calcium oxide, titanium oxide, mica, glass flake, zeolite, diatomaceous earth, perlite, vermiculite, shirasu balloon, glass microballoon, fly ash, and glass beads.

As examples of organic fillers there are mentioned wood powder, pulp powder, phenolic resins, and other incompatible synthetic resin powders.

Among the fillers exemplified above, calcium carbonate, talc, silica, barium sulfate, aluminum hydroxide and magnesium hydroxide are preferred. The fillers exemplified above may be used in combination of two or more.

An average particle diameter of the filler is not larger than 20 μm, preferably not larger than 10 μm and more preferably not larger than 5 μm.

Larger particle diameters are apt to cause breakage in stretching and result in increase in pore diameter of the film obtained, so that the function as a porous film is deteriorated.

When mixing a filler with a synthetic resin, the surface of the filler is often treated in order to improve the dispersibility of the filler. In some cases, such treatment is also effective in the process of the present invention. As examples of surface treating agents are mentioned fatty acids, metallic salts or acid amides thereof, resin acid, titanate-based coupling agents, silane-based coupling agents, aluminate-based coupling agents, waxes, and oils.

In the present invention, the proportion of the filler is in the range of 20 to 500, preferably 30 to 400, and more preferably 40 to 300, parts by weight based on the total of 100 parts by weight of the LLDPE and the ULDPE. If it is above 500 parts by weight, the film formability will be deteriorated, and a proportion of the filler below 20 parts by weight will result in a film which is poor in gas and moisture permeability. In point of gas and moisture permeability, the larger the amount of filler, the more preferable in general. However, as the amount of filler increases, the film strength generally tends to become lower. Therefore, it is desirable to use polymers which permit incorporation of a larger amount of filler and which afford a film not so reduced in strength. In this point, the LLDPE and the ULDPE are extremely superior in characteristics as compared with other polymers and this is the reason why they are suitable in the process of the present invention.

In the present invention, moreover, in order to improve the flexibility, elongation and formability of the porous film and remedy the unevenness in stretching at a low stretch ratio, and to suppress the orientation during strecching through plasticization to thereby enhance the tearing strength, it is desirable to add a dispersing aid (d) in an amount up to 20 parts by weight based on the weight of the foregoing composition.

As examples of the dispersing aid there are mentioned plasticizers such as phthalic acid-, phosphoric acid-, fatty acid-, epoxy- and polyester-based plasticizers as well as chlorinated paraffins; waxes such as paraffin wax, polyethylene wax, ethylene-ethyl acrylate copolymer wax and ionomer wax; liquid polybutadiene and derivatives thereof, liquid polyisoprene, and liquid polybutene, with polybutene being most preferred.

The amount of the dispersing aid is up to 20 parts by weight, preferably up to 10 parts by weight. Even if the dispersing aid is added in an amount exceeding 20 parts by weight, there is no hope of improvement in effect, but rather the dispersing aid will bleed out, resulting in the film surface becoming sticky and the film strength being reduced. Thus, such amount is not desirable.

In the present invention it is desirable that the composition be melt-kneaded before being melt-formed into film. Three are various methods. An example is to melt-knead the composition using open roll mill, Banbury's mixer, or pressure kneader. But these methods generally adopt a batch process and are therefore inferior in productivity. The use of an extruder is preferable. As the extruder there may be used a full-flighted screw extruder, but the kneading is sometimes insufficient, so it is desirable to use an extruder having a kneading mechanism or a multi-screw extruder.

In the present invention, pellets thus melt-kneaded are melt-formed into a film according to a process usually employed for forming films from thermoplastic resins. More specifically, there is adopted an extrusion method such as inflation method using a circular die or a T-die extrusion using a T-die.

The film thus formed is then stretched to obtain a desired porous film. Stretching methods are generally classified broadly into a uniaxial stretching method and a biaxial stretching method. Both methods are adoptable in the present invention. As the uniaxial stretching method there usually is employed a roll stretching method. In this case, it is desirable to keep a necking phenomenon of the film to a minimum. To this end there may be taken some measures for preventing shrinkage in the width direction of the film; for example, the roll spacing is made as narrow as possible, or pinch rolls or static electricity is used.

The biaxial stretching method is classified broadly into a one-step method and a two-step method, which are both employable. How to stretch is not specially limited in the present invention; there are various ways for stretching, including a tenter method and a tubular method.

Stretching is performed at a temperature in the range of between 30° C. and 110° C., preferably between 50° C. and 105° C. If the stretching temperature is below 30° C., there will occur unevenness in stretching, not affording a good film. At a temperature above 110° C. it will be possible to effect stretching in a satisfactory manner, but the resulting film will be poor in porosity. In general, stretching of a synthetic resin such as polyethylene is performed at a temperature near the melting point of the resin, and if it is done at a very low temperature, there will occur unevenness in stretching. In view of this point, in the present invention the dispersing aid such as liquid compounds exemplified above, is added to improve stretchability to an extent permitting stretching even at a very low temperature and affording a desirable porous film. Also in this point the present invention is characteristic.

As to the stretch ratio, it is determined in consideration of the balance between mechanical properties and gas- and moisture-permeability both required for the resulting film. Where a high gas permeability is required, it is desirable to effect stretching at a high stretch ratio of 5 to 6. In this case, however, the tearing strength of the film may be impaired. Especially, when stretching uniaxially, the resulting film may be easily torn in the vertical direction. Therefore, in general, it is desirable to effect stretching at a low stretch ratio of 1.5 to 4, preferably 2 to 3. In the present invention, at a low stretching ratio of 2 to 3 it will be possible to effect stretching without occuring unevenness in stretching and to obtain a porous film having well-balanced physical properties, including both of a high permeability and a high mechanical strength. The porous film thus obtained may be subjected to an annealing treatment in order to suppress post shrinkage. It is preferable to effect annealing treatment at a temperature between the stretching temperature and the melting point of ULDPE.

The porous film of the present invention can be adjusted in its moisture permeability by changing the particle diameter, the amount of filler used or the stretch ratio adopted. Although the required moisture permeability of the porous film differs according to uses such as clothes, sanitary articles and medical supplies, it is usually in the range of 50 to 1,000, preferably 50 to 800, more preferably 50 to 600, $g/m^2.24$ hr.

In addition to the above components of the composition there may be added, in ranges not affecting the objects of the present invention, other thermoplastic resins (e.g. polyethylene, polypropylene, polystyrene, nylon), antioxidant, heat stabilizer (e.g. hindered phenol, phosphite, hydroquinone, thioether), weatherproofing agent (e.g. benzophenone, triazole, salicylate, hindered amine, Ni complex), dye or pigment, flame retardant, antistatic agent, lubricant, mold release agent, or deodorant. The additives may be added alone or in combination. According to the present invention, the filler-incorporated composition in subjected to forming into film and stretching to obtain a porous film. In this case, a feature resides in using as polymers the LLDPE and the special ULDPE. The resulting effects are summarized as follows.

(i) The LLDPE is a syntnetic resin which is flexible to some extent, but is still rigid for the formation of a porous film. Mixing it with the ULDPE results in a great improvement of its flexibility without marked reduction of its strength.

(ii) Both LLDPE and ULDPE are highly receptive of the filler and even when the filler is added in an amount as large as 500 parts by weight, the flexibility and elongation are maintained. Consequently, a stretched film obtained using such composition has a very large number of pores and is superior in gas- and moisture-permeability.

(iii) Where the dispersing aid is used in addition to the ULDPE, stretching can be done at lower temperature and stretch ratio, whereby there is obtained a porous film having superior characteristics.

(iv) In practising the process of the present invention, inexpensive materials can be used and existing apparatus are employable directly, and the productivity is high, so it is possible to obtain a porous film economically advantageously.

Porous films prepared according to the process of the present invention having various features as described above are applicable to various uses, including clothes (e.g. golf wear, skiwear, raincoat, hats), sanitary articles (e.g. paper diaper, articles for menses), medical supplies (e.g. filter, plaster), and industrial filter materials (for water treatment, for air cleaning, various separators).

The following examples are given to illustrate the present invention in more detail, in which physical properties of films obtained were measured by the following methods.

HOW TO MEASURE PHYSICAL PROPERTIES OF FILM

Strength at break: ASTM D882
Elongation: D882
Tensile modulus: D882
Tearing strength: JIS P 8116
Moisture permeability: 50 $cm^3$ of pure water is poured into a glass cup 85 mm in diameter, then a test film is put on the cup, followed by sealing completely along the circumference, then the cup with the film is allowed to stand 10 days in a room held at a temperature of 23° C. and a relative humidity of 50%. Thereafter, a decrease of weight is measured and the result, which is moisture permeability, is expressed in terms of permeability per m² a day (24 hr).

EXAMPLE 1

50 parts by weight of LINIREX AF2320 (trade name) (MFR=1.0 g/10 min, density=0.922 g/cm³, a product of Nippon Petrochemicals Co., Ltd., symbol "A") as LLDPE, 50 parts by weight of ULDPE (a product of Nippon Petrochemicals Co., Ltd., symbol "B") consisting of ethylene and 1-butene and having a density of 0.901 g/cm³, an MFR of 1.2 g/10 min, a Tm of 121° C. and a $C_6$ insolubles content of 82 wt. %, and 150 parts by weight of calcium carbonate as a filler, were kneaded and extruded using a biaxial extruder to obtain pellets. Using the pellets, a film having a thickness of 60 to 85 μm was formed under the following conditions by means of an inflation die:
Die diameter: 100 mm
Forming temperature: 190° C.
Blow-up ratio: 1.7
Frost line height: 250 mm Then, the film was uniaxially stretched by means of a proximity roll stretcher having a pinch mechanism to obtain a porous film. Stretching temperature, stretch ratio, and the film thickness after stretching, are as set forth in Table 1. Physical properties measured in the stretching direction of the film are also set out in the same table. External appearance of the film was evaluated according to whether unevenness in stretching occurred or not.

EXAMPLES 2-6

Porous films were prepared in the same way as in Example 1 except that the blending ratio of the polymers A, B and the filler (calcium carbonate) as well as stretching conditions were varied as in Table 1. Physical properties of the films are as set forth in the same table.

EXAMPLE 7

A porous film was prepared in the same way as in Example 1 except that ULDPE (a product of Nippon Petrochemicals Co., Ltd., symbol "C") consisting of ethylene and propylene and having a density of 0.897 g/cm³, an MFR of 2.5 g/10 min, a Tm of 121° C. and a $C_6$ insolubles content of 68 wt. % was used in place of the one used in Example 1, and the stretching conditions were changed as in Table 1. Physical properties of the film are as set out in the same table.

EXAMPLES 8-10

Using polybutene (having an average molecular weight of 1,350, trade name: Nisseki Polybutene HV300, a product of Nippon Petrochemicals Co., Ltd., symbol "D") as a dispersing aid, a porous film was prepared in the same way as in Example 1 except that the blending ratio and stretching conditions were changed as in Table 1. Physical properties of the film are as shown in the same table.

COMPARATIVE EXAMPLE 1

A film was formed and stretched in the same manner as in Example 1 except that ULDPE was not used and the blending ratio and stretching conditions set forth in Table 2 were adopted. But there occurred unevenness in stretching and the film obtained was not satisfactory.

COMPARATIVE EXAMPLE 2

A stretched film was obtained in the same manner as in Example 1 except that the same composition as in Comparative Example 1 and the stretching conditions shown in Table 2 were used. Physical properties of the film are as set forth in Table 2.

COMPARATIVE EXAMPLE 3

A srretched film was obtained using the same composition as in Example 1 and the stretching conditions shown in Table 2. Physical properties of the film are as set forth in Table 2.

COMPARATIVE EXAMPLE 4

A stretched film was obtained in the same manner as in Example 1 except that in place of ULDPE there was used TAFMER P0480 (a product of Mitsui Petrochemical Industries, Ltd., symbol "E") consisting of ethylene and propylene and having a density of 0.88, an MFR of 1.1 g/10 min, (indistinct in Tm, and a $C_6$ insolubles content approximately not more than 10 wt. %), and the stretching conditions were changed as in Table 2. Physical properties of the film are as set out in Table 2.

COMPARATIVE EXAMPLE 5

A stretched film was obtained using the same composition as in Example 9 and the stretching conditions shown in Table 2. Physical properties of the film are as set forth in Table 2.

TABLE 1

| | Item | Unit | Example 1 | Example 2 | Example 3 | Example 4 | Example 5 |
|---|---|---|---|---|---|---|---|
| Composition | LLDPE | wt. % | A-50 | A-50 | A-50 | A-50 | A-75 |
| | ULDPE | wt. % | B-50 | B-50 | B-50 | B-50 | B-25 |
| | Dispersing aid | wt. part | — | — | — | — | — |
| | Filler | wt. part | 150 | 150 | 250 | 100 | 150 |
| Stretching Conditions | Temperature | °C. | 85 | 85 | 85 | 70 | 100 |
| | Stretch ratio | times | 2 | 3 | 2 | 2 | 3 |
| | Thickness (after stretching) | μm | 46 | 32 | 36 | 37 | 32 |
| Physical Properties of Film | Strength at break | Kg/cm² | 410 | 490 | 430 | 440 | 440 |
| | Elongation at break | % | 230 | 150 | 160 | 310 | 200 |
| | Tensile modulus | Kg/cm² | 1,150 | 1,620 | 980 | 1,100 | 1,980 |
| | Tearing strength | Kg·cm/cm | 8.2 | 6.9 | 5.9 | 12 | 6.1 |
| | Moisture permeability | g/m²·day | 82 | 101 | 230 | 90 | 72 |
| Appearance of Film*1 | | — | ⊚ | ⊚ | ⊚ | ○ | ○ |

| | Item | Unit | Example 6 | Example 7 | Example 8 | Example 9 | Example 10 |
|---|---|---|---|---|---|---|---|
| Composition | LLDPE | wt. % | A-25 | A-50 | A-50 | A-50 | A-50 |
| | ULDPE | wt. % | B-75 | C-50 | B-50 | B-50 | B-50 |

TABLE 1-continued

|  |  |  |  |  | D-5 | D-10 | D-15 |
|---|---|---|---|---|---|---|---|
|  | Dispersing aid | wt. part | — | — | D-5 | D-10 | D-15 |
|  | Filler | wt. part | 150 | 150 | 150 | 150 | 250 |
| Stretching | Temperature | °C. | 70 | 80 | 70 | 40 | 50 |
| Conditions | Stretch ratio | times | 2 | 2 | 3 | 3 | 2 |
|  | Thickness (after stretching) | μm | 33 | 32 | 32 | 32 | 36 |
| Physical | Strength at break | Kg/cm² | 380 | 420 | 390 | 360 | 380 |
| Properties | Elongation at break | % | 270 | 210 | 250 | 230 | 240 |
| of Film | Tensile modulus | Kg/cm² | 780 | 1,230 | 730 | 700 | 750 |
|  | Tearing strength | Kg · cm/cm | 9.9 | 8.0 | 12 | 10.8 | 11.3 |
|  | Moisture permeability | g/m² · day | 193 | 91 | 150 | 220 | 200 |
| Appearance of Film*¹ |  | — | ○ | ◉ | ◉ | ◉ | ◉ |

*¹ ◉ ... very good
○ ... good
△ ... somewhat uneven in stretching
X ... conspicuous unevenness in stretching

TABLE 2

|  | Item | Unit | Comparative 1 | Comparative 2 | Comparative 3 | Comparative 4 | Comparative 5 |
|---|---|---|---|---|---|---|---|
| Composition | LLDPE | wt. % | A-100 | A-100 | A-50 | A-50 | A-50 |
|  | ULDPE | wt. % | — | — | B-50 | E-50 | B-50 |
|  | Dispersing aid | wt. part | — | — | — | — | D-10 |
|  | Filler | wt. part | 150 | 150 | 150 | 150 | 150 |
| Stretching | Temperature | °C. | 85 | 115 | 115 | 70 | 25 |
| Conditions | Stretch ratio | times | 2 | 2 | 2 | 2 | 3 |
|  | Thickness (after stretching) | μm | 35 | 33 | 31 | 38 | 36 |
| Physical | Strength at break | Kg/cm² | not measured | 500 | 580 | 290 | not measured |
| Properties | Elongation at break | % |  | 180 | 190 | 280 |  |
| of Film | Tensile modulus | Kg/cm² |  | 4,690 | 2,460 | 770 |  |
|  | Tearing strength | Kg · cm/cm |  | 3.8 | 3.1 | 9.8 |  |
|  | Moisture permeability | g/m² · day |  | 5.7 | 5.4 | 129 |  |
| Appearance of Film |  | — | X | △ | ◉ | ○ | X |

Figure 1:
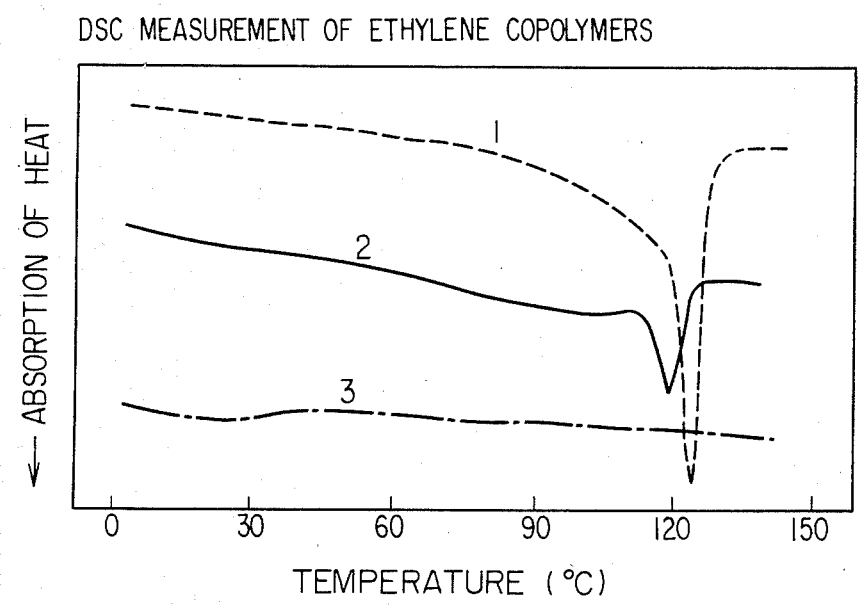
FIG. 1 is a graph showing crystal melt behaviors of typical LLDPE, ULDPE (used in the present invention) and EPR as determined according to a differential scanning calorimetry (DSC).

What is claimed is:

1. A process for preparing a porous film or sheet, which process comprises melt-forming a composition into a film or sheet and then stretching the thus-formed film or sheet at a temperature in the range of 30° to 110° C., said composition containing:
   (a) 30–90% by weight of a linear low-density polyethylene having a density not smaller than 0.910 g/cm³ and smaller than 0.940 g/cm³;
   (b) 10–70% by weight of an ethylene/α-olefin copolymer having a density not smaller than 0.860 g/cm³ and smaller than 0.910 g/cm³, a boiling n-hexane insolubles content not less than 10% by weight and a maximum peak temperature not lower than 100° C. as measured according to a differential scanning calorimetry; and
   (c) 20–500 parts by weight of a filler based on 100 parts by weight of said resin components.

2. A process as set forth in claim 1, wherein a dispersing aid (d) is added to said composition in an amount not larger than 20 parts by weight.

3. A process as set forth in claim 2, wherein said dispersing aid is polybutene.

4. A process as set forth in claim 1, wherein said stretching is carried out at a temperature in the range of 50° to 105° C.

5. A process as set forth in claim 1, wherein said stretching is carried out at a stretch ratio of 1.5 to 4.0.

* * * * *